United States Patent
Maruyama et al.

(10) Patent No.: US 12,108,238 B2
(45) Date of Patent: Oct. 1, 2024

(54) INFORMATION PROCESSING DEVICE, CONTROL METHOD, AND NON-TRANSITORY COMPUTER-READABLE MEDIUM

(71) Applicant: NEC Corporation, Tokyo (JP)

(72) Inventors: Toshikazu Maruyama, Tokyo (JP); Shizuko Kanegae, Tokyo (JP); Izumi Endo, Tokyo (JP); Kazunari Someya, Tokyo (JP); Goh Shibata, Tokyo (JP); Kiyoshi Morisaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 123 days.

(21) Appl. No.: 17/781,624

(22) PCT Filed: Dec. 3, 2020

(86) PCT No.: PCT/JP2020/044988
§ 371 (c)(1),
(2) Date: Jun. 1, 2022

(87) PCT Pub. No.: WO2021/112161
PCT Pub. Date: Jun. 10, 2021

(65) Prior Publication Data
US 2023/0059119 A1    Feb. 23, 2023

(30) Foreign Application Priority Data
Dec. 3, 2019    (JP) .................. 2019-219107

(51) Int. Cl.
*H04S 7/00*    (2006.01)
*G06F 3/16*    (2006.01)

(52) U.S. Cl.
CPC ............ *H04S 7/303* (2013.01); *G06F 3/16* (2013.01); *H04S 7/40* (2013.01)

(58) Field of Classification Search
CPC ............ H04S 7/303; H04S 7/40; G06F 3/16
See application file for complete search history.

(56) References Cited

U.S. PATENT DOCUMENTS

2020/0382894 A1* 12/2020 Walsh .................. H04S 7/306

FOREIGN PATENT DOCUMENTS

JP    2002-199498 A    7/2002
JP    2008-200255 A    9/2008
(Continued)

OTHER PUBLICATIONS

Machine translation of JP 2002199498A, 8 pages. (Year: 2002).*
(Continued)

*Primary Examiner* — Ping Lee

(57) ABSTRACT

Provided is an information processing apparatus capable of outputting a desired sound to a user. An information processing apparatus includes: a first acquisition unit that acquires first position information indicating position information of a user; a second acquisition unit that acquires second position information indicating position information of a predetermined object; a generation unit that generates, based on the first position information and the second position information, sound information in which a sound image is localized on the predetermined object, the sound information being related to the predetermined object; and a control unit that executes control to output the generated sound information to the user.

8 Claims, 12 Drawing Sheets

(56) References Cited

FOREIGN PATENT DOCUMENTS

| | | |
|---|---|---|
| JP | 2012-212237 A | 11/2012 |
| JP | 2018-097437 A | 6/2018 |
| JP | 2019-197478 A | 11/2019 |

OTHER PUBLICATIONS

JP Office Action for JP Application No. 2021-562705, mailed on Jul. 25, 2023 with English Translation.
International Search Report for PCT Application No. PCT/JP2020/044988, mailed on Jan. 12, 2021.
English translation of Written opinion for PCT Application No. PCT/JP2020/044988, mailed on Jan. 12, 2021.

* cited by examiner

INFORMATION PROCESSING DEVICE, CONTROL METHOD, AND NON-TRANSITORY COMPUTER-READABLE MEDIUM

This application is a National Stage Entry of PCT/JP2020/044988 filed on Dec. 3, 2020, which claims priority from Japanese Patent Application 2019-219107 filed on Dec. 3, 2019, the contents of all of which are incorporated herein by reference, in their entirety.

TECHNICAL FIELD

The present disclosure relates to an information processing, a control method, and a control program.

BACKGROUND ART

In order to provide a user with a sound emitted from a personified object, a technique has been known in which the personified object generates a sound on which a sound image is localized. Patent Literature 1 discloses a technique in which sound data of a personified object is output from a speaker with a volume of sound corresponding to a position of the object displayed by an augmented reality (AR), based on sensor data acquired by a wearable information display apparatus.

CITATION LIST

Patent Literature

Patent Literature 1: Japanese Unexamined Patent Application Publication No. 2018-097437

SUMMARY OF INVENTION

Technical Problem

In the technique disclosed in Patent Literature 1, sound data of the object is processed based on sensor data related to a line of sight, a moving direction, and a motion of a user. In other words, in the related technique disclosed in Patent Literature 1, sound data is processed based only on user information on the premise that the position of the object on which a sound image is localized is fixed.

By the way, with diversification and sophistication of information services, a service is being studied in which a sound image can be localized on an actual object and thus a user feels that a sound is virtually output from the object. Further, a service is being studied in which a sound image is localized even on a moving object in order to provide a new experience service that cannot be experience in the real world.

The technique disclosed in Patent Literature 1 is based on the premise that the object does not move on which the sound image is localized. Therefore, when there is a possibility that the object moves on which the sound image is localized and the position of the object changes, sound data may be generated as if a sound is emitted from a position different from the position of the object. According to the technique disclosed in Patent Literature 1, when the position of the object on which the sound image is localized changes, a problem arises that desired sound data is not output to the user.

One of objects of the present disclosure is to provide an information processing apparatus, a control method, and a control program capable of outputting a desired sound to a user in view of the above-described problems.

Solution to Problem

An information processing apparatus according to the present disclosure includes:
a first acquisition unit that acquires first position information indicating position information of a user;
a second acquisition unit that acquires second position information indicating position information of a predetermined object;
a generation unit that generates, based on the first position information and the second position information, sound information in which a sound image is localized on the predetermined object, the sound information being related to the predetermined object; and
a control unit that executes control to output the generated sound information to the user.

A control method according to the present disclosure includes:
acquiring first position information indicating position information of a user;
acquiring second position information indicating position information of a predetermined object;
generating, based on the first position information and the second position information, sound information in which a sound image is localized on the predetermined object, the sound information being related to the predetermined object; and
executing control to output the generated sound information to the user.

A control program according to the present disclosure that causes a computer to execute:
a process of acquiring first position information indicating position information of a user;
a process of acquiring second position information indicating position information of a predetermined object;
a process of generating, based on the first position information and the second position information, sound information in which a sound image is localized on the predetermined object, the sound information being related to the predetermined object; and
a process of executing control to output the generated sound information to the user.

Advantageous Effects of Invention

According to the present disclosure, it is possible to provide an information processing apparatus, a control method, and a control program capable of outputting a desired sound to a user.

EXAMPLE EMBODIMENT

Figure 1:
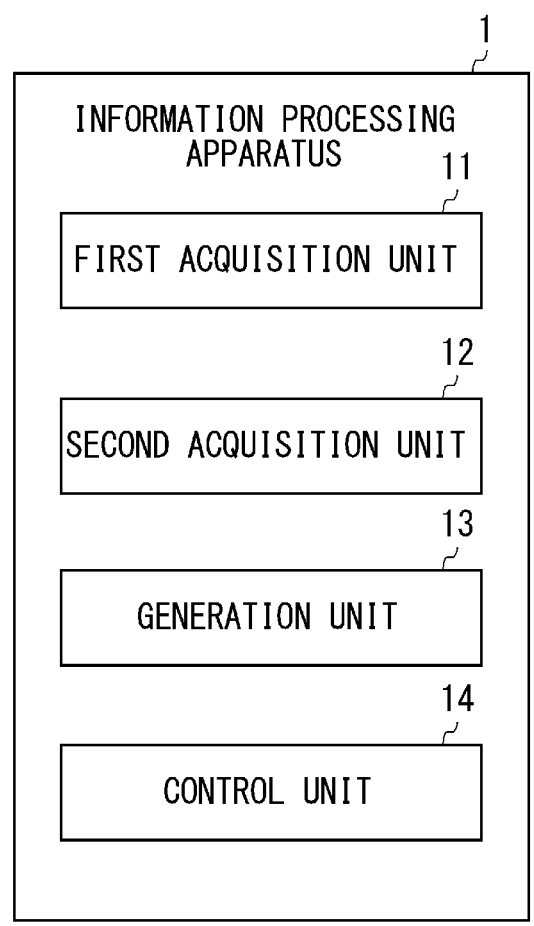
FIG. 1 is a diagram showing a configuration example of an information processing apparatus according to a first example embodiment.

Example embodiments will be described below with reference to the drawings. In the example embodiments, the same components are denoted by the same reference numerals, and will not be described repeatedly.

First Example Embodiment

A configuration example of an information processing apparatus 1 according to a first example embodiment will be described with reference to FIG. 1. FIG. 1 is a diagram showing the configuration example of the information processing apparatus according to the first example embodiment. The information processing apparatus 1 includes a first acquisition unit 11, a second acquisition unit 12, a generation unit 13, and a control unit 14.

The first acquisition unit 11 acquires position information of a user from a communication terminal (not shown).

The second acquisition unit 12 acquires position information of a predetermined object. The predetermined object is a target object on which a sound image is localized. The second acquisition unit 12 may acquire position information of the predetermined object based on a position measurement signal, a captured image, or sensing data related to the predetermined object. The second acquisition unit 12 may acquire the position information of the predetermined object at all times or when a user exists in a predetermined area associated with the predetermined object.

In a case of being based on the position measurement signal, the second acquisition unit 12 may acquire the position information of the predetermined object using, for example, a GPS (Global Positioning System) signal or a wireless communication signal such as WiFi. Alternatively, in a case of being based on the captured image, the second acquisition unit 12 may estimate a distance and a direction between the predetermined object and an image capturing apparatus, which generates the captured image, from the captured image in which the predetermined object is captured, and acquire the position information of the predetermined object. Alternatively, the second acquisition unit 12 may acquire, based on a size and a direction of a predetermined mark attached to the predetermined object included in the captured image, the position information of the predetermined object. Alternatively, the second acquisition unit 12 may acquire the position information of the predetermined object, based on sensing data of a visible light sensor, for example.

The generation unit 13 generates, based on the position information of the user and the position information of the predetermined object, sound information related to the predetermined object, that is, sound information in which a sound image is localized in the predetermined object. The sound information generated by the generation unit 13 may be prescribed sound information, or may be sound information based on contents in which a sound spoken from the user is recognized. Further, the generation unit 13 may generate the sound information at all times or when a user exists in the predetermined area associated with the predetermined object.

The control unit 14 executes control to output the sound information generated by the generation unit 13 to the user. The control unit 14 may control the sound information to output at all times or when a user exists in the predetermined area associated with the predetermined object.

Figure 2:
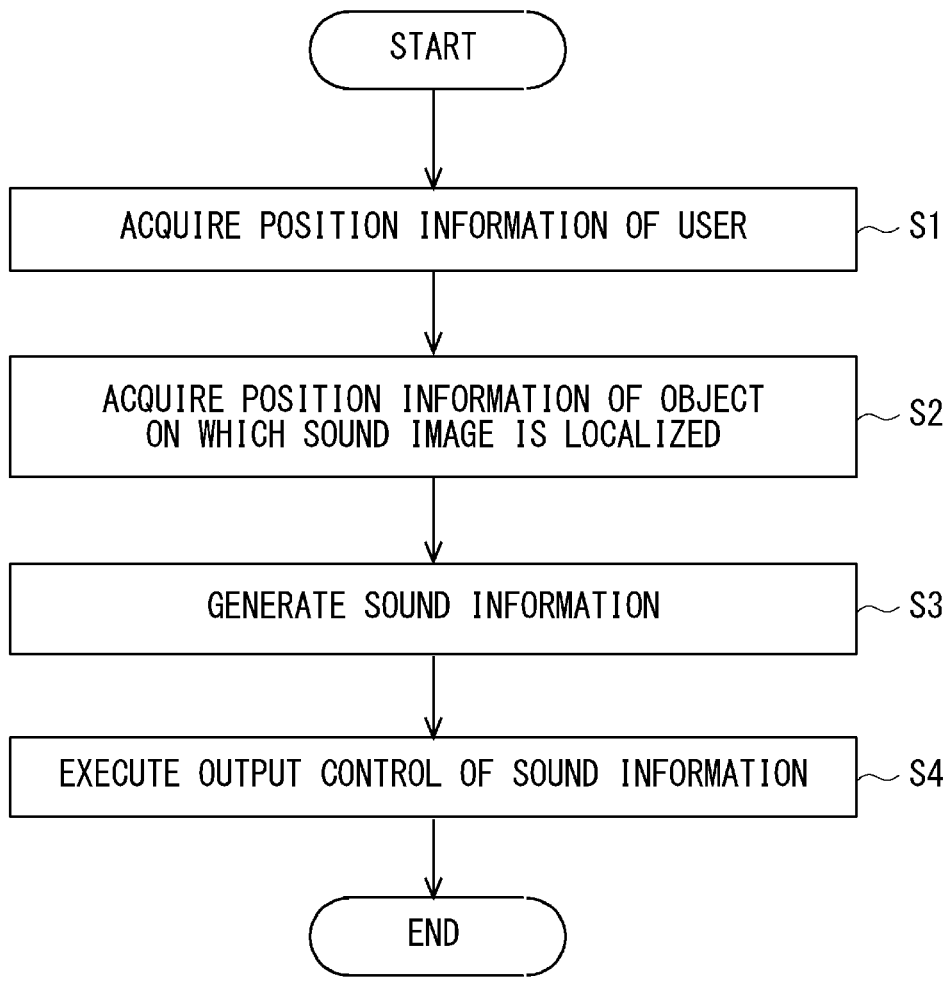
FIG. 2 is a diagram showing an operation example of the information processing apparatus according to the first example embodiment.

Next, an operation example of the information processing apparatus 1 according to the first example embodiment will be described with reference to FIG. 2. FIG. 2 is a flowchart showing the operation example of the information processing apparatus according to the first example embodiment.

The first acquisition unit 11 acquires position information of a user from a communication terminal (not shown) (step S1).

The second acquisition unit 12 acquires position information of an object on which the sound image is localized (step S2).

The generation unit 13 generates, based on the position information of the user and the position information of the object on which the sound image is localized, sound information related to the object on which the sound image is localized, that is, the sound information that the sound image is localized on the object (step S3).

The control unit 14 executes control to output the sound information generated by the generation unit 13 to the user (step S4).

The information processing apparatus 1 acquires the position information of the predetermined object on which the sound image is localized, and generates the sound information using not only the position information of the user but also the position information of the predetermined object. In other words, the information processing apparatus 1 can generate sound information according to the position of the predetermined object even when the position of the predetermined object, on which the sound image is localized, is changed. For this reason, the user can hear sound information as if it is a sound emitted from a position where the predetermined object is located. Therefore, according to the information processing apparatus 1 of the first example embodiment, even when the target on which the sound image is localized moves, a desired sound can be output to the user.

Second Example Embodiment

Subsequently, a second example embodiment will be described. The second example embodiment is an example embodiment in which the first example embodiment is embodied. First, an outline of the second example embodiment will be described before a description of a specific configuration example of the second example embodiment.

<Outline>

In recent years, a service using an AR technology has been studied. As a service using the AR technology, for example, a service has been studied in which animals speaks virtually in a zoo. Since the animals cannot speak actually, such a service may be said to be an AR service that augments a real world, or may be referred to as acoustic AR service. Such a service can be provided not only in zoos but also in shops or tourist spots, for example.

The second example embodiment relates to an information processing system that realizes the so-called acoustic AR service described above. As described above, since the information processing system is a system that realizes the acoustic AR service, it may be referred to as an acoustic AR system.

Figure 3:
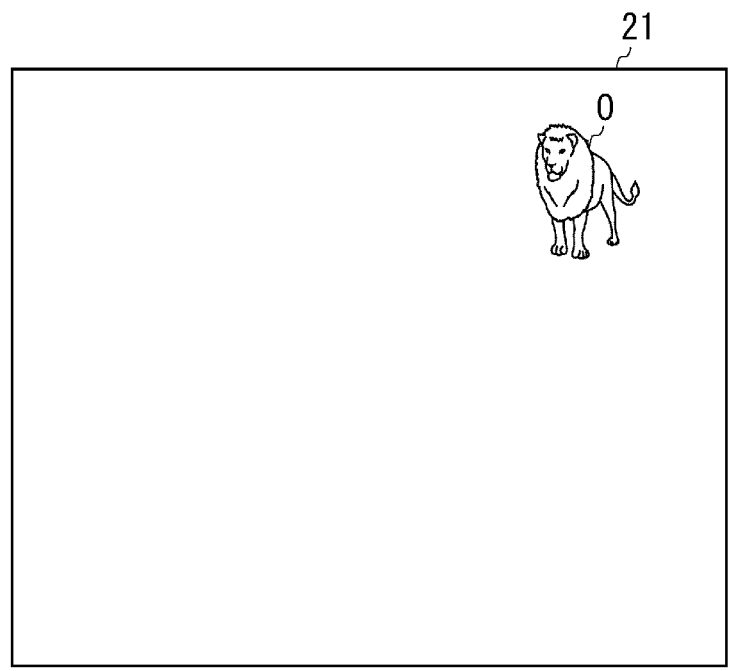
FIG. 3 is a diagram for describing an outline of an information processing system according to a second example embodiment.
Figure 3:
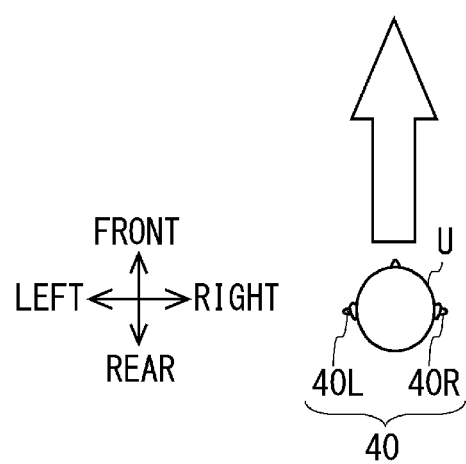

Here, an outline of an information processing system according to the second example embodiment will be described with reference to FIG. 3. FIG. 3 is a diagram for illustrating the information processing system according to the second example embodiment. Here, as an example, the information processing system according to the second example embodiment will be described as a system that provides an acoustic AR service realized in a zoo.

FIG. 3 is a schematic diagram schematically showing a situation where an area accommodating an object O in a zoo is viewed from vertically top to bottom. In FIG. 3, an area 21 surrounded by a solid square line is, for example, the area in which the object O is accommodated, and the solid square line represents, for example, a boundary line of a cage in which the object O is accommodated. The object O represents a specific animal such as a lion. In FIG. 3, the object O is shown so as to have a fixed position, but actually moves in the area 21. In FIG. 3, the object O is described as being a specific animal, but may be any object existing in the area 21 without being limited to the specific animal. In the following description, the object O may also be described as an animal O.

When a predetermined condition is satisfied, for example, when a user U mounted with a communication terminal 40 approaches the area 21, the information processing system according to the second example embodiment outputs sound information indicating that a sound image is localized on the object O, to the user U. In other words, when the predetermined condition is satisfied, the information processing system according to the second example embodiment outputs sound information as if the object O speaks from the position of the object O, to the user U. Solid line arrows indicate front, rear, left, and right directions of the user U.

In the present example embodiment, the communication terminal 40 will be described as a communication terminal including a left unit 40L mounted on a left ear of the user U and a right unit 40R mounted on a right ear. In addition, the sound information output to the user U is sound information output to each of the left unit 40L and the right unit 40R, and will be described as including left ear sound information corresponding to the left unit 40L and right ear sound information corresponding to the right unit 40R.

Configuration Example of Information Processing System

Figure 4:
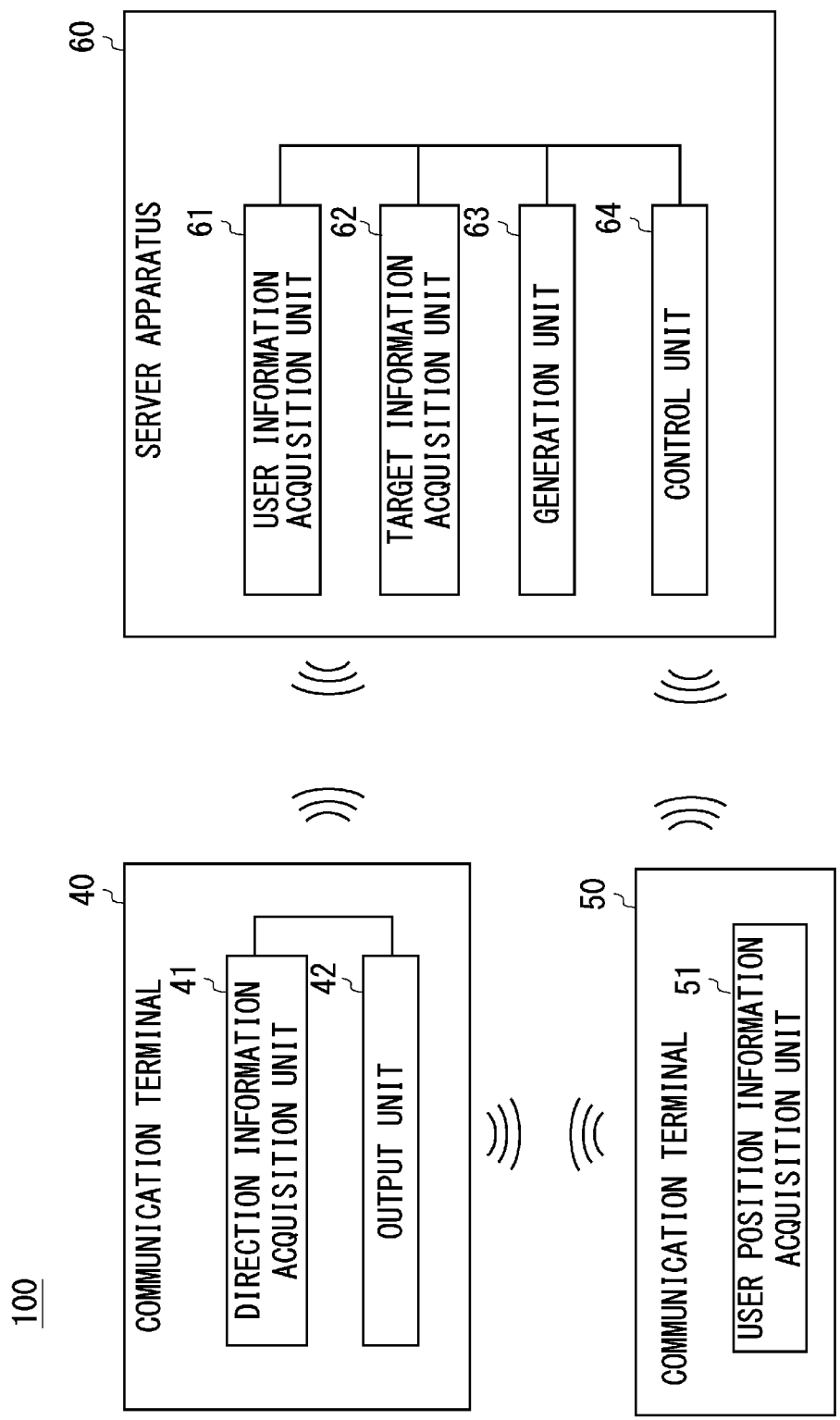
FIG. 4 is a diagram showing a configuration example of the information processing system according to a second example embodiment.

A configuration example of an information processing system 100 will be described below with reference to FIG. 4. FIG. 4 is a diagram showing a configuration example of the information processing system according to the second example embodiment. The information processing system 100 includes communication terminals 40 and 50 and a server apparatus 60.

The communication terminal 40 is the communication terminal 40 shown in FIG. 3, and is a communication terminal mounted on the user. As described above, the communication terminal 40 is a communication terminal mounted on each of both ears of the user, and includes a left unit 40L mounted on the left ear of the user and a right unit 40R mounted on a right ear of the user. Since the communication terminal 40 is a device mounted on both ears of the user, it may be referred to as a hearable device. The communication terminal 40 may be a communication terminal in which the left unit 40L and the right unit 40R are integrally formed.

The communication terminal 40 is, for example, a communication terminal capable of performing wireless communication provided by a communication carrier, and communicates with the server apparatus 60 via a network provided by the communication carrier. The communication terminal 40 acquires direction information of the user, and transmits the acquired direction information to the server apparatus 60. The communication terminal 40 outputs the sound information generated by the server apparatus 60 to each of both ears of the user. Specifically, the communication terminal 40 outputs the sound information indicating that the sound image is localized on the object O as shown in FIG. 3, to each of both ears of the user. The communication terminal 40 (left unit 40L and right unit 40R) is described as directly communicating with the server apparatus 60, but may be configured to communicate with the server apparatus 60 via the communication terminal 50.

The communication terminal 50 may be, for example, a smartphone terminal, a tablet terminal, a mobile phone, or a personal computer apparatus. The communication terminal 50 connects and communicates with the communication terminal 40 by wireless communication such as Bluetooth (registered trademark) or WiFi. Further, the communication terminal 50 communicates with the server apparatus 60 via, for example, a network provided by the communication carrier. The communication terminal 50 acquires the position information of the user, and transmits the acquired position information of the user to the server apparatus 60.

In FIG. 4, the information processing system 100 includes two communication terminals (communication terminals 40 and 50), but the communication terminals 40 and 50 may be configured by one communication terminal such as a head-mounted display. Further, the communication terminal 40 may be configured to acquire not only the direction information of the user but also the position information of the user. In other words, the information processing system 100 may include at least one communication terminal.

The server apparatus 60 corresponds to the information processing apparatus 1 in the first example embodiment. The server apparatus 60 communicates with the communication terminals 40 and 50 via, for example, a network provided by the communication carrier. The server apparatus 60 acquires the direction information and the position information of the user from each of the communication terminals 40 and 50.

The server apparatus 60 acquires the position information of the target object on which the sound image is localized, as in the object O shown in FIG. 3. The server apparatus 60 generates, based on the direction information, the position information of the user, and the position information of the object, sound information indicating that a sound image is localized on the object, and outputs the generated sound information. In the present example embodiment, the target object on which the sound image is localized is described as an animal, but may be any object without being limited thereto.

Configuration Example of Communication Terminal

A configuration example of the communication terminal 40 will be described below. The communication terminal 40 includes a direction information acquisition unit 41 and an output unit 42. Since the communication terminal 40 includes the left unit 40L and the right unit 40R, both of the left unit 40L and the right unit 40R may include the direction information acquisition unit 41 and the output unit 42.

The direction information acquisition unit 41 includes, for example, a 9-axis sensor (including a 3-axis accelerometer, a 3-axis gyroscope, and a 3-axis compass sensor). The direction information acquisition unit 41 acquires the direction information of the user indicating a direction in which the user is facing, by the 9-axis sensor. Specifically, the direction information acquisition unit 41 acquires direction information including a face direction of the user acquired by the 9-axis sensor. The direction information acquisition unit 41 transmits the acquired direction information to the server apparatus 60. The direction information acquisition unit 41 may transmit the acquired direction information to the communication terminal 50.

Since the direction information acquisition unit 41 includes the 9-axis sensor, it can acquire not only the face direction of the user but also a posture of the user, and thus the direction information may be referred to as posture information including the posture of the user. Since the direction information is data acquired by the 9-axis sensor, it may be referred to as sensing data. The direction information acquisition unit 41 estimates a line of sight of the user based on at least the captured image of the user's face, and a line-of-sight direction of the user may be included in the direction information.

The direction information acquisition unit 41 acquires direction information periodically or nonperiodically. The direction information acquisition unit 41 may acquire direction information when it is detected that the face direction of the user is changed. Alternatively, the direction information acquisition unit 41 may acquire direction information when the user enters the area associated with the target animal on which the sound image is localized, as in the object O shown in FIG. 3. The area associated with the target animal on which the sound image is localized may be an area referred to as a geofence.

The output unit 42 includes, for example, a stereo speaker. The output unit 42 also functions as a communication unit, receives the sound information generated by the server apparatus 60, and outputs the received sound information to the ears of the user. The sound information generated by the server apparatus 60 includes left ear sound information for the left unit 40L and right ear sound information for the right unit 40R. The output unit 42 of the left unit 40L outputs the left ear sound information, and the output unit 42 of the right unit 40R outputs the right ear sound information.

Next, a configuration example of the communication terminal 50 will be described. The communication terminal 50 includes a user position information acquisition unit 51.

The user position information acquisition unit 51 includes, for example, a GPS receiver. The user position information acquisition unit 51 receives a GPS signal, and acquires position information of the user based on the GPS signal. The user position information acquisition unit 51 transmits the acquired position information of the user to the server apparatus 60. The position information may be latitude/longitude information, or coordinate information using a predetermined position as a reference. In addition, the position information may include altitude information.

The user position information acquisition unit 51 acquires positions of the left unit 40L and the right unit 40R of the communication terminal 40. As described above, the communication terminal 50 communicates with the left unit 40L and the right unit 40R by wireless communication such as Bluetooth or WiFi. The user position information acquisition unit 51 acquires position information of each of the left unit 40L and the right unit 40R, using the direction information (sensing data) acquired by the direction information acquisition unit 41 of the left unit 40L and the right unit 40R. The user position information acquisition unit 51 uses the position information of each of the left unit 40L and the right unit 40R as position information of each of both ears of the user. The user position information acquisition unit 51 transmits the position information of the user including the position information of each of both ears of the user to the server apparatus 60. The user position information acquisition unit 51 may acquire the position information of each of the left unit 40L and the right unit 40R, based on a signal intensity and an arrival direction of a wireless signal used for communication with the left unit 40L and the right unit 40R.

The user position information acquisition unit 51 periodically acquires the position of each of the left unit 40L and the right unit 40R. The user position information acquisition unit 51 may acquire the position of each of the left unit 40L and the right unit 40R when detecting a change of at least one of the position of the left unit 40L and the position of the right unit 40R.

Configuration Example of Server Apparatus

Next, a configuration example of the server apparatus 60 will be described. The server apparatus 60 includes a user information acquisition unit 61, a target information acquisition unit 62, a generation unit 63, and a control unit 64.

The user information acquisition unit 61 corresponds to the first acquisition unit 11 in the first example embodiment. The user information acquisition unit 61 acquires position information of the user and direction information of the user. The user information acquisition unit 61 also functions as a communication unit, and acquires the direction information by receiving the direction information from the communication terminal 40. Further, the user information acquisition unit 61 acquires the position information of the user by receiving the position information of the user from the communication terminal 50. The user information acquisition unit 61 outputs the position information of the user and the direction information of the user to the generation unit 63.

The target information acquisition unit 62 corresponds to the second acquisition unit 12 in the first example embodiment. The target information acquisition unit 62 acquires position information of a target animal on which a sound image is localized, and outputs the acquired position information of the animal to the generation unit 63. The target animal on which the sound image is localized is the animal shown by the object O in FIG. 2. The target information acquisition unit 62 may acquire the position information of a target animal, on which a sound image is localized, at all times, or may acquire the position information of the animal when the user exists in an area called a geofence associated with the target animal on which the sound image is localized.

The target information acquisition unit 62 acquires the position information of the target animal on which the sound image is localized, based on the position measurement signal, the captured image captured by the image capturing apparatus, or the sensing data related to the target animal on which the sound image is localized.

In a case of being based on the position measurement signal, the target information acquisition unit 62 may acquire the position information of the animal, on which the sound image is localized, using a GPS signal or a wireless communication signal such as WiFi.

In a case of being based on the captured image, the target information acquisition unit 62 may estimates a distance and a direction between the animal and the image capturing apparatus, which generates the captured image, from the captured image of the animal on which the sound image is localized, and acquire the position information of the predetermined object. Alternatively, the target information acquisition unit 62 may acquire the position information of the animal, based on the size and direction of a predetermined mark included in the captured image and attached to the animal on which the sound image is localized. Alternatively, the target information acquisition unit 62 may acquire the position information of the animal on which the sound image is localized, based on the sensing data of a visible light sensor, for example.

The generation unit 63 corresponds to the generation unit 13 in the first example embodiment. The generation unit 63 generates sound information in which the sound image is localized on the animal, that is, sound information related to the animal on which the sound image is localized, based on the position information of the user, the direction information of the user, and the position information of the animal on which the sound is localized. In other words, the generation unit 65 generates the sound information such the user can recognize that the sound is spoken by the animal. The sound information may be prescribed one sound information or a plurality of types of sound information, or may be sound information based on the result of sound recognition of a sound spoken from the user.

The generation unit 63 may generate the sound information at all times, or may generate the sound information when the user exists in an area called a geofence associated with the target animal on which the sound image is localized.

As described above, the position information of the user includes the position information of each of both ears of the user, and the sound information includes the left ear sound information for the left unit 40L and the right ear sound information for the right unit 40R. The generation unit 63 generates the left ear sound information in which the sound image is localized on the animal, that is, the sound information related to the animal, based on the left ear position information of the user, the direction information of the user, and the position information of the animal on which the sound image is localized. The generation unit 63 generates the right ear sound information in which the sound image is localized on the animal, that is, the sound information related to the animal, based on the right ear position information of the user, the direction information of the user, and the position information of the animal on which the sound image is localized. The generation unit 63 outputs the generated sound information to the control unit 64.

The control unit 64 corresponds to the control unit 14 in the first example embodiment. The control unit 64 executes control to output the generated sound information to the user from the output unit 42. The control unit 64 also functions as a communication unit, and transmits the sound information generated by the generation unit 63 to the communication terminal 40. The control unit 64 transmits the left ear sound information to the left unit 40L, and transmits the right ear sound information to the right unit 40R.

The control unit 64 executes control to output the sound information from the output unit 42 at a predetermined timing. The control unit 64 may output the sound information at all times, or may output the sound information when the user exists in an area called a geofence associated with the target animal on which the sound image is localized.

The control unit 64 controls the sound information output by the output unit 42. The control unit 64 outputs the sound information according to whether the animal exists in the face direction of the user, based on the position information of the user, a face direction of the user included in the direction information of the user, the position information of the target animal on which the sound image is localized.

Specifically, the control unit 64 outputs first sound information to the user through the output unit 42 when the animal exists in the face direction of the user. Further, the control unit 64 outputs second sound information to the user through the output unit 42 when the animal does not exist in the face direction of the user. In other words, the control unit 64 detects whether the user is opposite to the target animal on which the sound image is localized, and adjusts the sound information according to the result of detection. In other words, the control unit 64 changes the sound information output before and after the user is opposite to the target animal on which the sound image is localized.

Further, the control unit 64 corrects the sound information generated by the generation unit 63, according to displacement of at least one of the position information and direction information of the user, and the position information of the animal on which the sound image is localized. The control unit 64 controls the output unit 42 to output the corrected sound information to the user.

Operation Example of Server Apparatus

Figure 5:
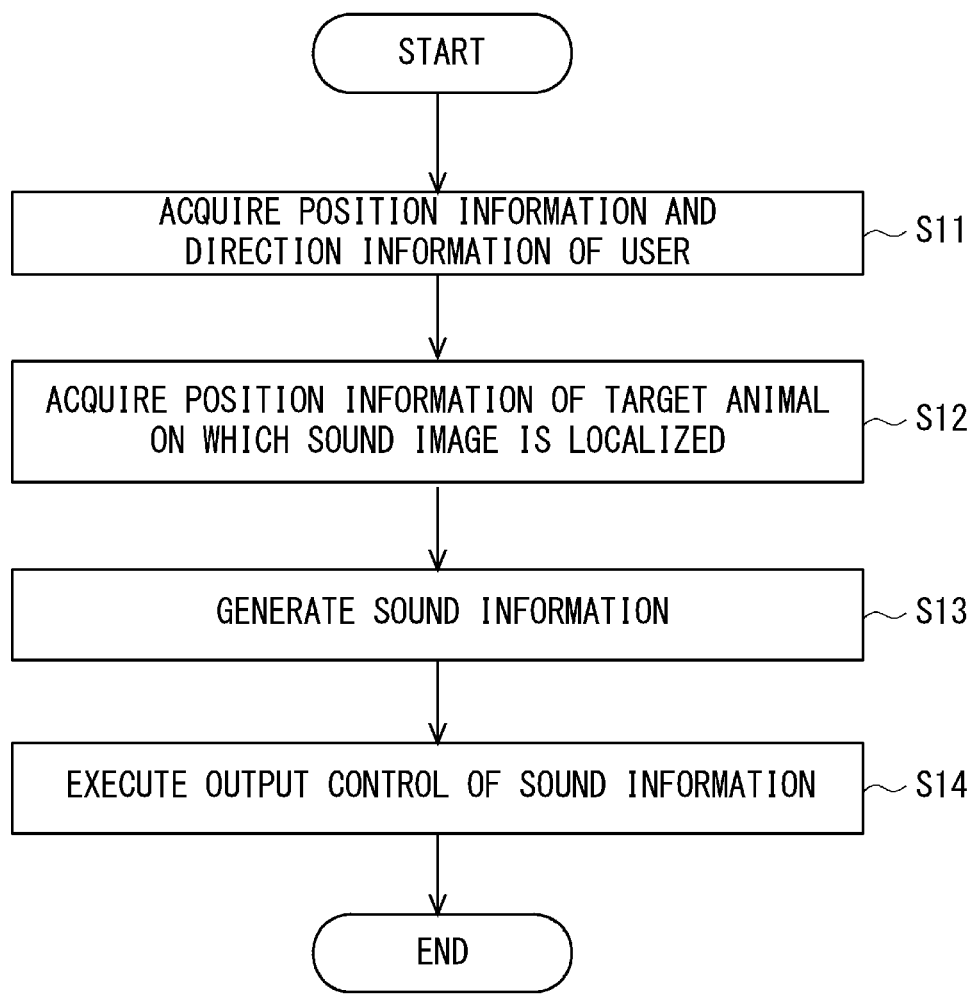
FIG. 5 is a flowchart showing an operation example of a server apparatus according to the second example embodiment.

Next, an operation example of the server apparatus 60 will be described with reference to FIG. 5. FIG. 5 is a flowchart showing the operation example of the server apparatus according to the second example embodiment.

The user information acquisition unit 61 acquires position information and direction information of the user (step S11). The user position information acquisition unit 51 periodically receives the position information of the user from the user position information acquisition unit 51 to acquire the position information of the user. The position information of the user includes position information of each of both ears of the user. Further, the user information acquisition unit 61 periodically receive direction information of the user from the direction information acquisition unit 41 to acquire the direction information. The user information acquisition unit 61 outputs the position information and direction information of the user to the generation unit 63.

In FIG. 5, the user information acquisition unit 61 acquires the position information and direction information of the user in step S11, but step S11 may include a step of acquiring the position information of the user and a step of acquiring the direction information of the user. In FIG. 5, although step S11 is executed only once, step S11 is a processing step that is periodically executed, and an execution order of step S11 is not limited to FIG. 5.

The target information acquisition unit 62 acquires position information of the target animal on which the sound image is localized (step S12). The target information acquisition unit 62 acquires the position information of the predetermined object, based on the position measurement signal, the captured image of the predetermined object, or the sensing data related to the predetermined object.

In FIG. 5, although step S12 is executed only once, step S12 is a processing step that is periodically executed, and an execution order of step S12 is not limited to FIG. 5.

The generation unit 63 generates sound information related to the animal on which the sound image is localized, that is, sound information in which the sound image is localized on the animal (step S13). The generation unit 63 generates the sound information related to the animal, that is, sound information in which the sound image is localized on the animal, based on the position information and direction information of the user and the position information of the animal on which the sound image is localized. In other words, the generation unit 63 generates sound information including a volume of sound, a direction, and contents at that time distance suitable for a distance and a direction between the user and the animal on which the sound image is localized, such the user recognizes that the sound is spoken by the animal.

The generation unit 63 generates left ear sound information in which the sound image is localized on the animal, that is, the sound information related to the animal, based on the left ear position information of the user, the direction information of the user, and the position information of the animal on which the sound image is localized. The generation unit 63 generates right ear sound information in which the sound image is localized on the animal, that is, the sound information related to the animal, based on the right ear position information of the user, the direction information of the user, and the position information of the animal on which the sound image is localized.

The control unit 64 executes output control of the generated sound information (step S14). The control unit 64 executes control to output the generated sound information from the output unit 42 to the user. The control unit 64 transmits the sound information generated by the generation unit 63 to the communication terminal 40. The control unit 64 transmits the left ear sound information to the left unit 40L, and transmits the right ear sound information to the right unit 40R.

The control unit 64 corrects the sound information generated by the generation unit 63, according to displacement of at least one of the position information and direction information of the user, and the position information of the animal on which the sound image is localized. The control unit 64 controls the output unit 42 to output the corrected sound information to the user.

As described above, the user information acquisition unit 61 acquires the direction information and the position information of the user from each of the communication terminals 40 and 50. The target information acquisition unit 62 acquires the position information of the animal on which the sound image is localized. The generation unit 63 generates the sound information related to the animal, using not only the position information and direction information of the user but also the position information of the animal on which the sound image is localized. In other words, the generation unit 63 can generate the sound information according to the position of the animal even when the animal moves on which the sound image is localized. For this reason, in a case of using the server apparatus 60 according to the second example embodiment, it is possible to output, to the user, the sound information that the user can recognize as being emitted from the animal on which the sound image is localized. Therefore, according to the server apparatus 60 of the second example embodiment, a desired sound can be output to the user even when the target moves on which the sound image is localized.

Further, the control unit 64 corrects the sound information output to the communication terminal 40 even when the animal moves on which the sound image is localized. Therefore, according to the server apparatus 60 of the second example embodiment, even when the target is a moving object on which the sound image is localized, it is possible to output the sound information according to the movement, and thus more realistic sound information can be output to the user.

Modification

The second example embodiment may be modified as follows. Even when the second example embodiment is modified as follows, the same effect as that of the second example embodiment can be obtained.

The generation unit 63 may generate the sound information, based on the position information of the user, the face direction included in the direction information of the user, and the position information of the animal on which the sound image is localized, even when the animal exists in the face direction of the user. Alternatively, the generation unit 63 may generate the sound information, based on the position information of the user, the line-of-sight direction of the user included in the direction information of the user, and the position information of the animal on which the sound image is localized, even when the animal exists in the line-of-sight direction of the user. The line-of-sight direction of the user may be acquired by the direction information acquisition unit 41 and be included in the direction information. Alternatively, the line-of-sight direction of the user may be estimated by the user information acquisition unit 61 based on the captured image of the user's face, or may be included in the direction information by the user information acquisition unit 61.

When the animal exists in the face direction of the user, the control unit 64 may transmit the sound information to the output unit 42, and may control the output unit 42 to output the transmitted sound information to the user. Alternatively, when the animal exists in the line-of-sight direction of the user, the control unit 64 may transmit the sound information to the output unit 42, and may control the output unit 42 to output the transmitted sound information to the user.

Third Example Embodiment

Subsequently, a third example embodiment will be described. The third example embodiment is different from the second example embodiment in terms of processing contents of acquiring the position information of the target animal on which the sound image is localized. Also in the third example embodiment, the configuration example of the information processing system and the configuration examples of the communication terminals 40 and 50 are the same as those in the second example embodiment. Therefore, the configuration example of the information processing system and the configuration examples of the communication terminals 40 and 50 will not be described as appropriate.

Configuration Example of Server Apparatus

Figure 6:
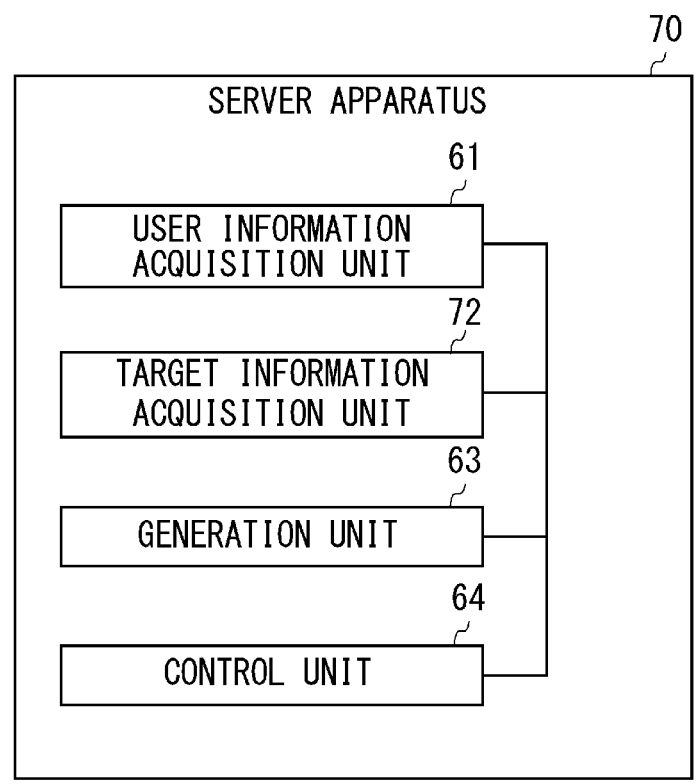
FIG. 6 is a diagram showing a configuration example of a server apparatus according to a third example embodiment.

Next, a configuration example of a server apparatus 70 according to the third example embodiment will be described. FIG. 6 is a diagram showing the configuration example of the server apparatus according to the third example embodiment. As shown in FIG. 6, the server apparatus 70 includes a user information acquisition unit 61, a target information acquisition unit 72, a generation unit 63, and a control unit 64. Configuration examples of the user information acquisition unit 61, the generation unit 63, and the control unit 64 are the same as those of the server apparatus 60 according to the second example embodiment. For this reason, the configuration examples of the user information acquisition unit 61, the generation unit 63, and the control unit 64 will not be described as appropriate.

Similarly to the second example embodiment, the target information acquisition unit 72 acquires the position information of the target animal on which the sound image is localized, and outputs the acquired position information of the animal to the generation unit 63. The target information acquisition unit 72 may acquire the position information of the animal, on which the sound image is localized, at all times, or may acquire the position information of the animal when the user exists in an area called a geofence associated with the target animal on which the sound image is localized.

Based on a captured image of a plurality of persons who are watching the target animal on which the sound image is localized, the target information acquisition unit 72 estimates a watching direction of each of the plurality of persons. The target information acquisition unit 72 estimates a position where the watching directions intersect with each other using respective positions of the plurality of estimated persons as references, and acquires the estimated position as position information of the target animal on which the sound image is localized. The position information may be latitude/longitude information, or coordinate information using a predetermined position as a reference. In addition, the position information may include altitude information. The captured image may be a still image or a moving image.

The target information acquisition unit 72 recognizes the captured image, and specifies a face of each of the plurality of persons. The target information acquisition unit 72 may estimate a face direction in which the specified face of each person is facing, and specify the estimated face direction as the watching direction of each person. Alternatively, the target information acquisition unit 72 may detect feature points of the specified face of each person and specify features of the inner corner of the eyes, the outer corner of the eyes, and the pupil around the eyes from the detected feature points, thereby estimating the line-of-sight direction of each person, and specifying the estimated line-of-sight direction as the watching direction of each person.

Figure 7:
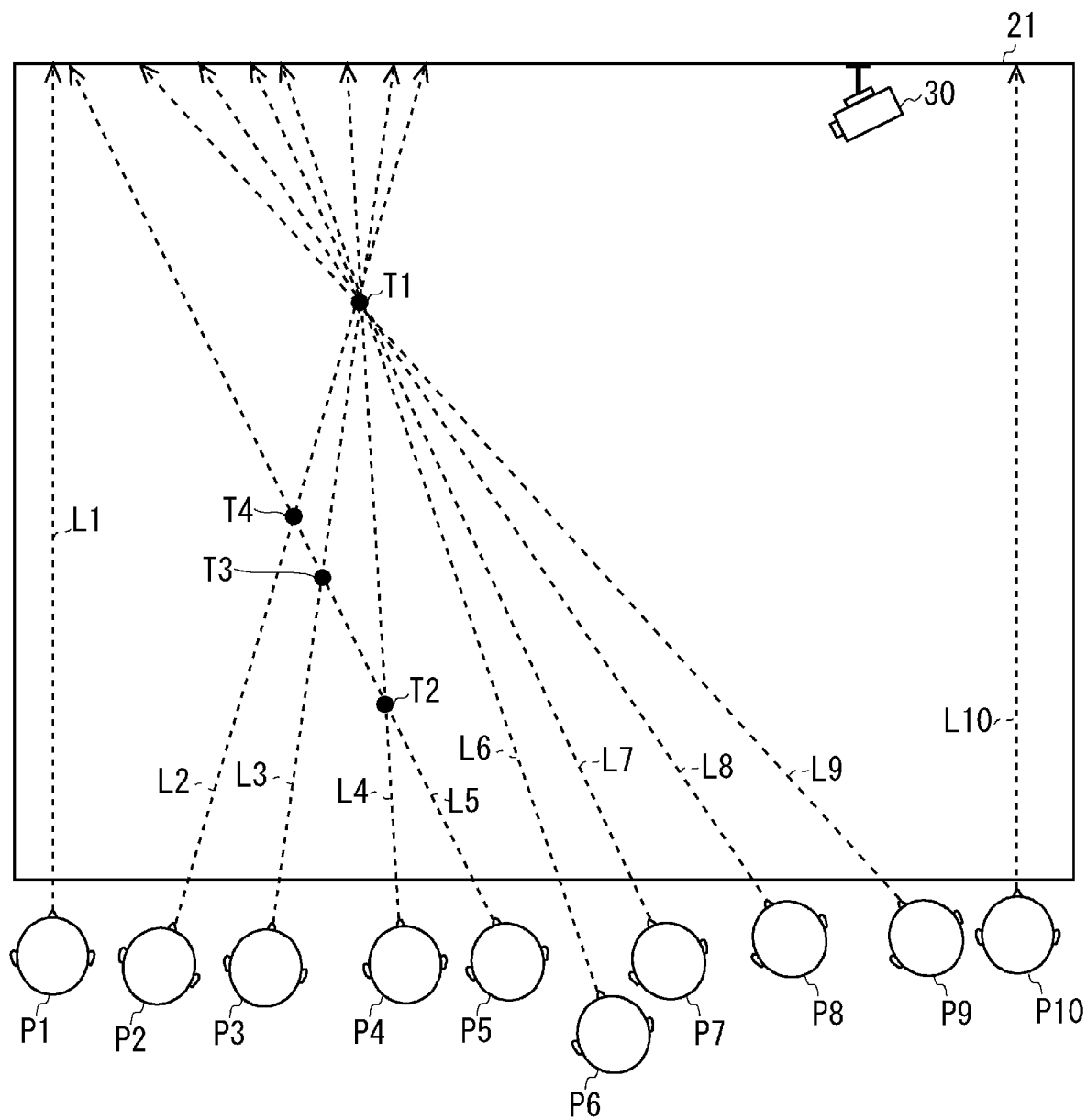
FIG. 7 is a diagram for describing a process of acquiring position information of a target on which a sound image is localized.

Here, a description will be given with reference to FIG. 7 with respect to a process that is executed by the target information acquisition unit 72 to acquire the position information of the target animal on which the sound image is localized. FIG. 7 is a diagram for describing a process of acquiring the position information of the target on which the sound image is localized.

FIG. 7 is an enlarged view of the area 21 shown in FIG. 3, and is a view showing a situation in which a plurality of persons around the area 21 are looking at an animal O. In FIG. 7, the animal O is not shown.

In the area 21, an image capturing apparatus 30 such as a monitoring camera is disposed to monitor the animal O or confirm the surrounding situation of the area 21. In FIG. 7, persons P1 to P10 represent a plurality of persons in the vicinity of the area 21. The image capturing apparatus 30 captures an image so as to include at least the faces of the plurality of persons (persons P1 to P10) who are looking at the animal O. The target information acquisition unit 72 acquires the image captured by the image capturing apparatus 30 from the image capturing apparatus 30, and estimates a watching direction of each of the plurality of persons (persons P1 to P10), based on the captured image.

Dotted lines (dotted-line arrows) L1 to L10 represent the watching directions of the persons P1 to P10, respectively. The dotted lines L2 to L9 intersect with other dotted lines at intersections T1 to T4, and the intersections T1 to T4 represent positions where the watching directions of the persons P2 to P9 intersect with each other.

It can be said that the intersection T1 is a point where seven dotted lines intersect and the watching directions of seven persons intersect, and a position where the seven persons are watching. It can be said that the intersection T2 is a point where two dotted lines intersect and the watching directions of two persons intersect, and a position where the two persons are watching. It can be said that the intersection T3 is a point where two dotted lines intersect and the watching directions of two persons intersect, and a position where the two persons are watching. It can be said that the intersection T4 is a point where two dotted lines intersect and the watching directions of two persons intersect, and a position where the two persons are watching.

The target information acquisition unit 72 specifies (acquires) the position information of the animal O, based on the position where the watching directions of the persons P1 to P10 intersect. The target information acquisition unit 72 may specify, as the position information of the animal O, a position of the intersection having the largest number of dotted lines indicating the watching direction and constituting each intersection from the intersections T1 to T4. In FIG. 7, since the intersection T1 has a large number of dotted lines constituting each intersection, the target information acquisition unit 72 may use the position of the intersection T1 as the position information of the animal O. It can be said that the intersections T1 to T4 indicate candidate for positions at which the respective persons are watching. For this reason, the target information acquisition unit 72 may use, as the position information of the animal O, the position at which the largest number of persons are watching, from the intersections T1 to T4.

In addition, the target information acquisition unit 72 may use a position of the center of a figure formed by the intersections T1 to T4, as the position information of the animal O. In FIG. 7, although there are four intersections, when there are two intersections, the target information acquisition unit 72 may use a midpoint of the two intersections, as the position information of the animal.

Alternatively, the target information acquisition unit 72 may use, as the position information of the animal O, a position of the center of a figure obtained by multiplying the position of each intersection by a weighting coefficient, which is the number of dotted lines constituting each intersection and indicating the watching direction of each person. In FIG. 7, seven dotted lines intersect at the intersection T1, and two dotted lines intersect at the intersections T2 to T4. For this reason, the target information acquisition unit 62 obtains a position T1' obtained by multiplying the position of the intersection T1 by a weighting coefficient of 7/13 (=7+2+2+2), and obtains positions TT to T4' obtained by multiplying the positions of the intersections T2 to T4 by a weighting coefficient of 2/13. Then, the target information acquisition unit 62 may use, as the position information of the animal O, a position of the center of a figure obtained from the positions T1' to T4'.

Alternatively, the target information acquisition unit 72 may exclude the watching direction of the person looking at a position different from that of other persons and use, as the position information of the animal O, a position of the intersection determined by the watching direction of the person selected from the persons P1 to P10.

In the example of FIG. 7, since the persons P1 and P10 are looking at different positions from the persons P2 to P9, the target information acquisition unit 72 excludes the dotted lines indicating the watching directions of the persons P1 and P10. Then, the target information acquisition unit 72 may use, as the position information of the animal O, the position at which most persons are watching (intersection T1 in FIG. 7) among the positions of the intersections determined by the watching directions of the persons P2 to P9. In FIG. 7, for example, it is assumed that the person P5 is facing in a completely different from other persons. In this case, the dotted line indicating the watching direction of the person P5 is excluded. Then, the intersections T2 to T4 also do not exist, and the intersection determined by the watching direction of each person is uniquely determined at the intersection T1.

In FIG. 7, the watching direction of each of the persons P1 to P10 is indicated by the dotted line (dotted-line arrow), but the watching direction of each of the persons P1 to P10 may be defined with reference to the dotted lines shown in FIG. 7, for example, as a range (area) having a predetermined width such as a face width of each person. In this case, the target information acquisition unit 72 may use, as the position information of the animal O, a center position of the area where the watching directions (watching ranges or watching areas) of the respective persons overlap.

Operation Example of Server Apparatus

Next, an operation example of the server apparatus 70 will be described. Since the operation executed by the server apparatus 70 is basically the same as the operation example shown in FIG. 5, it will be described with reference to FIG. 5. The operation executed by the server apparatus 70 is different from that in the second example in terms of step S12 shown in FIG. 5. For this reason, the operation performed in step S12 of FIG. 5 will be described.

In step S12, the target information acquisition unit 72 estimates a watching direction of each of a plurality of persons around the area, based on the captured image of surroundings of the area where the target animal exists on which the sound image is localized. The target information acquisition unit 72 estimates, based on the estimated watching directions of the plurality of persons, positions where the watching directions intersect. The target information acquisition unit 72 acquires, based on the estimated positions, the position information of the target animal on which the sound image is localized. The target information acquisition unit 72 outputs the position information of the target animal, on which the sound image is localized, to the generation unit 63.

As described above, the target information acquisition unit 72 acquires the position information of the animal, based on the watching directions of the plurality of persons who are looking at the animal on which the sound image is localized. Although the target information acquisition unit 72 is configured as in the third example embodiment, the same effect as that of the second example embodiment can be obtained. In other words, according to the server apparatus 70 of the third example embodiment, even when the target moves on which the sound image is localized, a desired sound can be output to the user. Further, according to the server apparatus 70 of the second example embodiment, even when the target is a moving object on which the sound image is localized, it is possible to output the sound information according to the movement, and thus more realistic sound information can be output to the user.

Fourth Example Embodiment

Subsequently, a fourth example embodiment will be described. The fourth example embodiment is an improved example of the second and third example embodiments. The server apparatus is configured to output the sound information to the user in the second and third example embodiments, but the server apparatus is configured to further output display information in the present example embodiment. In the following description, differences from the second example embodiment will be described.

Configuration Example of Information Processing System

Figure 8:
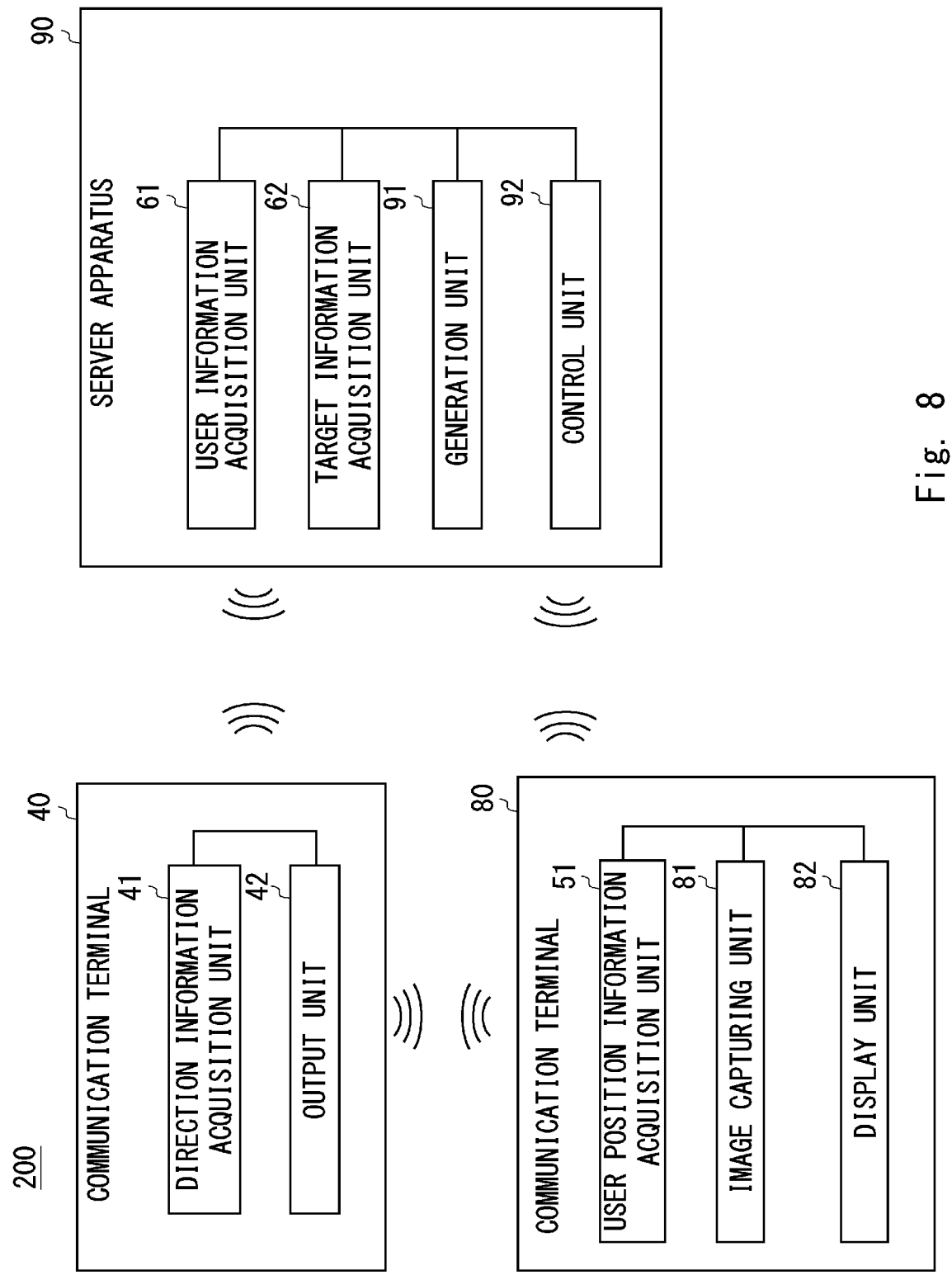
FIG. 8 is a diagram showing a configuration example of an information processing system according to a fourth example embodiment.

A configuration example of an information processing system 200 according to the fourth example embodiment will be described with reference to FIG. 8. FIG. 8 is a diagram showing the configuration example of the information processing system according to the fourth example embodiment. The information processing system 200 has a configuration in which the communication terminal 50 and the server apparatus 60 according to the second example embodiment are replaced with a communication terminal 80 and a server apparatus 90, respectively. The configuration example of the communication terminal 40 is the same as that in the second example embodiment, and thus will not be described as appropriate.

Configuration Example of Communication Terminal

Next, a configuration example of the communication terminal 80 will be described. The communication terminal 80 has a configuration in which an image capturing unit 81 and a display unit 82 are added to the configuration of the communication terminal 50 according to the second example embodiment. The configuration of the user position information acquisition unit 51 is the same as that in the second example embodiment, and thus will not be described as appropriate.

The image capturing unit 81 includes a camera, for example. The image capturing unit 81 captures a predetermined range and generates a captured image. The image capturing unit 81 outputs the generated captured image to the display unit 82. The captured image may be a still image or a moving image. Further, the image capturing unit 81 may transmit the generated captured image to a user information acquisition unit 61 of the server apparatus 90.

The display unit 82 includes a display, for example. The display unit 82 displays the image captured by the image capturing unit 81 on the display. Further, the display unit 82 receives display information generated by the server apparatus 90, and displays the received display information on the display. The display unit 82 determines whether the captured image includes the target animal on which the sound image is localized. When the captured image includes the target animal on which the sound image is localized, the display unit 82, displays the display information received from the server apparatus 90 at a position related to the animal. The display information may be moving image information or image information related to the target animal on which the sound image is localized.

When the image captured by the image capturing unit 81 includes the target animal on which the sound image is localized and an AR marker is disposed on the animal, the display unit 82 may display the display information (content) designated by the AR marker on the display.

Configuration Example of Server Apparatus

Next, a configuration example of the server apparatus 90 will be described. The server apparatus 90 includes a user information acquisition unit 61, a target information acquisition unit 62, a generation unit 91, and a control unit 92. The server apparatus 90 has a configuration in which the generation unit 63 and the control unit 64 in the second example embodiment are replaced with the generation unit 91 and the control unit 92, respectively. Configuration examples of the user information acquisition unit 61 and the target information acquisition unit 62 are basically the same as those in the second example embodiment, and thus will not be described as appropriate.

The user information acquisition unit 61 has the configuration of the user information acquisition unit 61 according to the second example embodiment. The user information acquisition unit 61 may further acquire the captured image generated by the image capturing unit 81 from the communication terminal 80, and when the captured image is acquired from the communication terminal 80, the user information acquisition unit 61 may output the captured image to the generation unit 91 and the control unit 92.

The generation unit 91 has the configuration of the generation unit 63 in the second example embodiment, and further generates the display information to be displayed on the display by the display unit 82. The display information may be moving image information or image information related to the target animal on which the sound image is localized. The generation unit 91 outputs the generated display information to the control unit 92.

When the captured image acquired by the user information acquisition unit 61 includes not only the target animal on which the sound image is localized but also other animals, the generation unit 91 may generate display information on the other animals. Then, the generation unit 91 may execute control under which the display unit 82 also displays the display information on the other animals through the control unit 92.

The control unit 92 has the configuration of the control unit 64 in the second example embodiment, executes control to output the generated sound information from the output unit 42, and executes the control under which the display unit 82 displays the display information on the display (screen).

The control unit 92 transmits the display information generated by the generation unit 91 to the communication terminal 80. The control unit 92 controls a timing at which the output unit 42 outputs the sound information and a timing at which the display unit 82 displays the display information on the display. The control unit 92 controls such that the sound information can be displayed at the timing of outputting the sound information. The control unit 92 transmits a notification indicating that the user can recognize that the display information can be seen on the display of the communication terminal 80 at the timing of outputting the sound information, to at least one of the communication terminals 40 and 80.

The control unit 92 may control the output unit 42 to output the sound information at the timing when the user enters the area associated with the target animal on which the sound image is localized, control the display unit 82 to display the display information on the display, and transmit the notification. Alternatively, the control unit 92 may control the output unit 42 to output the sound information at the timing when the animal on which the sound image is localized exists in the direction corresponding to the direction information of the user (face direction or line-of-sight direction). Then, the control unit 92 may control the display unit 82 to display the display information on the display, and transmit the notification. Alternatively, when the captured image generated by the image capturing unit 81 includes the animal, the control unit 92 may control the output unit 42 to output the sound information, control the display unit 82 to display the display information on the display, and transmit the notification.

Operation Example of Server Apparatus

Figure 9:
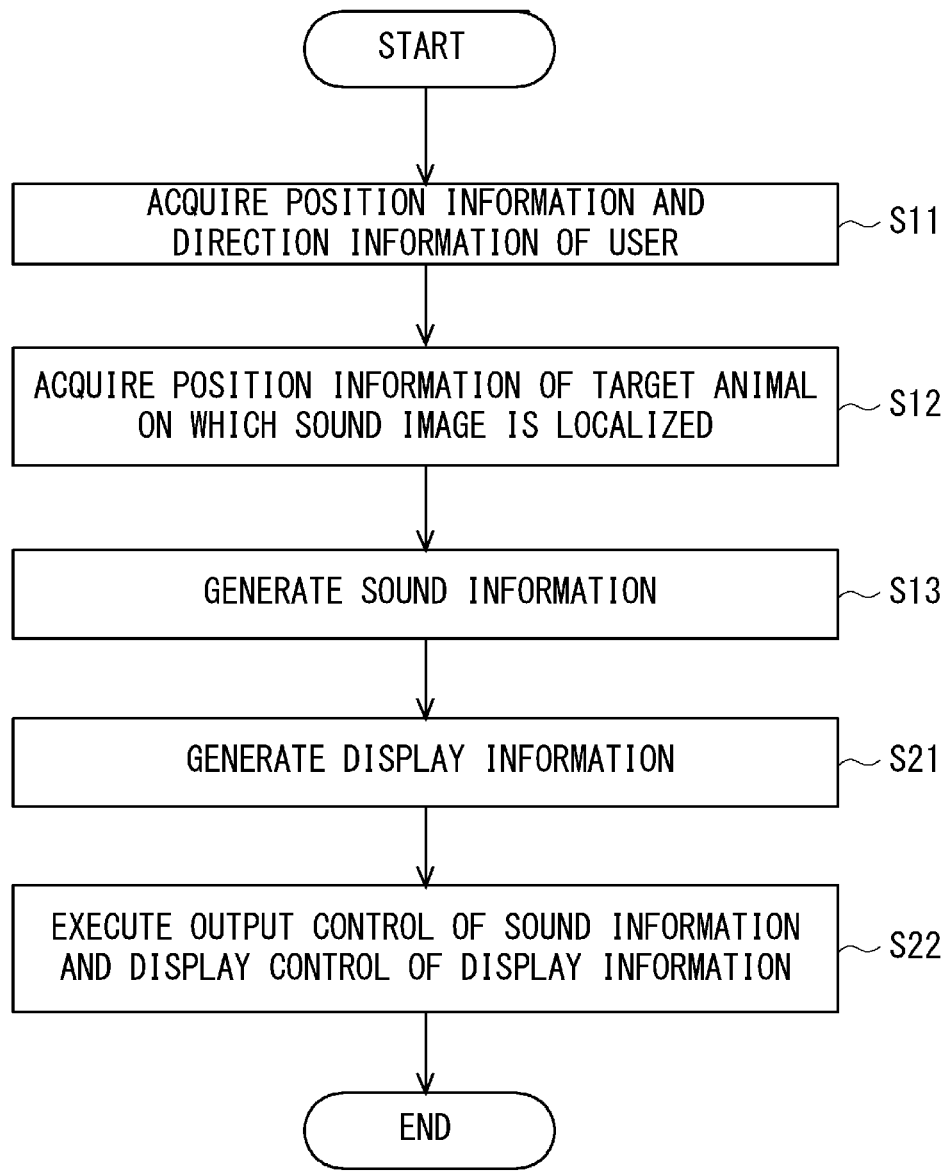
FIG. 9 is a flowchart showing an operation example of a server apparatus according to the fourth example embodiment.

Next, an operation example of the server apparatus 90 according to the fourth example embodiment will be described with reference to FIG. 9. FIG. 9 is a flowchart showing the operation example of the server apparatus according to the fourth example embodiment. The flowchart shown in FIG. 9 corresponds to that of FIG. 5, and is a flowchart in which step S14 of the flowchart shown in FIG. 5 is replace with step S22. In addition, the flowchart shown in FIG. 9 is a flowchart in which step S21 is added to the flowchart shown in FIG. 5.

Operations executed in steps S11 to S13 out of operations of FIG. 9 are the same as those in FIG. 5, and thus will not be described.

In step S21, the generation unit 91 generates display information to be displayed on the display by the display unit 82 (step S21). The display information may be moving image information or image information related to the target animal on which the sound image is localized.

The control unit 92 executes output control of the generated sound information and display control of the generated display information (step S22). The control unit 92 controls the output unit 42 to output the generated sound information, and controls the display unit 82 to display the display information on the display (screen) of the communication terminal 80.

The control unit 92 transmits the sound information generated by the generation unit 91 to the communication terminal 40, and transmits the display information generated by the generation unit 91 to the communication terminal 80. The control unit 92 controls a timing at which the output unit 42 outputs the sound information and a timing at which the display unit 82 displays the display information on the display. The control unit 92 controls the display unit 82 to be able to display the display information on the display at the timing when the output unit 42 outputs the sound information. Then, the control unit 92 transmits a notification indicating that the user can recognize that the display information can be seen on the display of the communication terminal 80 to at least one of the communication terminals 40 and 80.

As described above, the generation unit 91 generates the display information of the target animal on which the sound image is localized. The control unit 92 controls the display unit 82 to display the display information generated by the generation unit 91 on the display. The user can see the information requested by the user as the display information by capturing the target animal, on which the sound image is localized, with the image capturing unit 81 of the communication terminal 80. Therefore, according to the server apparatus 90 of the fourth example embodiment, the information requested by the user can be provided to the user.

Fifth Example Embodiment

Subsequently, a fifth example embodiment will be described. The fifth example embodiment is an improved example of the second to fourth example embodiments. The fifth example embodiment is an example embodiment in a case where there are a plurality of target animals on which the sound image is localized. In the following description, differences from the fourth example embodiment will be described. A configuration example of an information processing system and configuration examples of communication terminals 40 and 80 in the fifth example embodiment are also the same as those in the fourth example embodiment. For this reason, the configuration example of the information processing system and the configuration examples of the communication terminals 40 and 80 will not be described as appropriate.

Configuration Example of Server Apparatus

Figure 10:
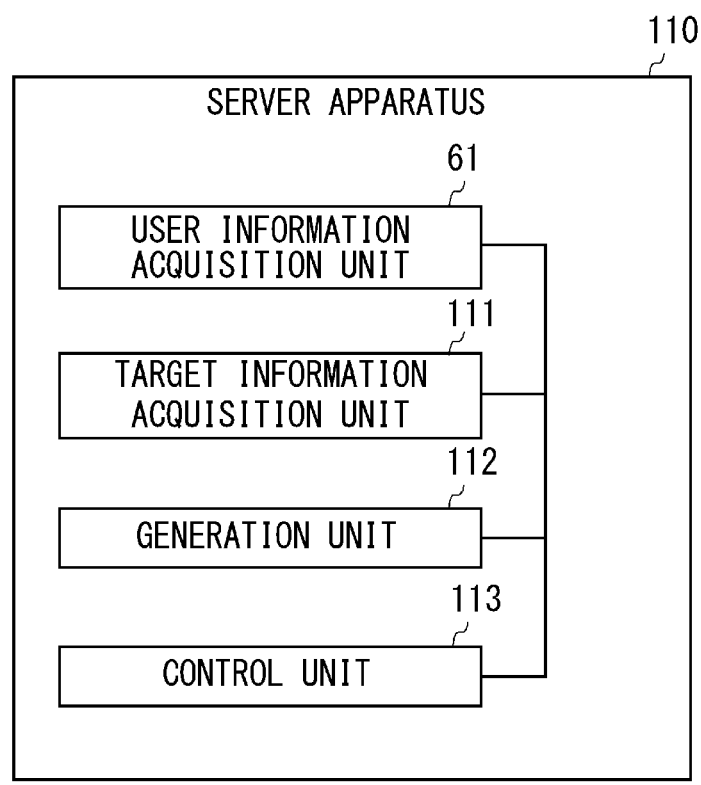
FIG. 10 is a diagram showing a configuration example of a server apparatus according to a fifth example embodiment.

A configuration example of a server apparatus 110 according to the fifth example embodiment will be described with reference to FIG. 10. FIG. 10 is a diagram showing the configuration example of the server apparatus according to the fifth example embodiment. As shown in FIG. 10, the server apparatus 110 includes a user information acquisition unit 61, a target information acquisition unit 111, a generation unit 112, and a control unit 113. A configuration example of the user information acquisition unit 61 is the same as that of the server apparatus 90 according to the fourth example embodiment. For this reason, the configuration of the user information acquisition unit 61 will not be described as appropriate.

The target information acquisition unit 111 acquires position information of each of the plurality of animals on which the sound image is localized. In a case of being based on the captured image of the animal on which the sound image is localized, the position measurement signal, or the sensor data, the target information acquisition unit 111 can specify the number and position of animals on which the sound image is localized. Therefore, the target information acquisition unit 111 may acquire the specified position as position information of each animal on which the sound image is localized.

In a case of using watching directions of a plurality of persons on which the sound image is localized, the target information acquisition unit 111 specifies, based on the captured image of each animal, the number of animals on which the sound image is localized. Then, the target information acquisition unit 111 may select as many animals as the number of animals, on which the sound image is localized, in order from the position of the intersection having the largest number of dotted lines indicating the watching direction and constituting each intersection from the positions (intersections) where the watching directions of the persons intersect.

Further, the target information acquisition unit 111 determines whether a plurality of animals on which sound image is localized are of the same kind. The target information acquisition unit 111 may determine, based on the position information of the plurality of animals on which the sound image is localized, whether the plurality of animals on which sound image is localized are of the same kind. The target information acquisition unit 62 may determine that the plurality of animals on which sound image is localized are of the same kind when the plurality of animals on which the sound image is localized is within a predetermined range, for example.

Alternatively, the target information acquisition unit 111 may acquire feature information of each animal on which the sound image is localized, and may determine, based on the acquired feature information of each animal, whether the plurality of animals on which sound image is localized are of the same kind. The target information acquisition unit 111 may calculate similarity of the feature information of the plurality of animals on which the sound image is localized, and may determine that the plurality of animals on which sound image is localized are of the same kind when the similarity is equal to or higher than a predetermined value.

The target information acquisition unit 111 may identify each animal based on the feature information of each animal on which the sound image is localized. The target information acquisition unit 111 may identify a name given to each animal and features different from other animals, based on the feature information of each animal.

The generation unit 112 specifies, based on the position information of the user, the direction information of the user, and the position information of the animal on which the sound image is localized, an animal existing in the direction (face direction or line-of-sight direction) corresponding to the direction information of the user, among the plurality of animals on which the sound image is localized. Then, the generation unit 112 generates sound information related to the specified animal, that is, sound information in which the sound image is localized on the specified animal. Further, the generation unit 112 generates display information related to the specified animal.

In addition, the generation unit 112 generates sound information and display information according to the determination result of whether the plurality of animals on which sound image is localized are of the same kind. The target information acquisition unit 111 may generate sound information and display information according to the feature information of each animal.

The control unit 113 specifies, based on the position information of the user, the direction information of the user, and the position information of the animal on which the sound image is localized, an animal existing in the direction (face direction or line-of-sight direction) corresponding to the direction information of the user from the plurality of animals on which the sound image is localized. Then, the control unit 113 controls the output unit 42 to output the sound information related to the specified animal. Further, the control unit 113 controls the display unit 82 to display the display information related to the specified animal.

Operation Example of Server Apparatus

Figure 11:
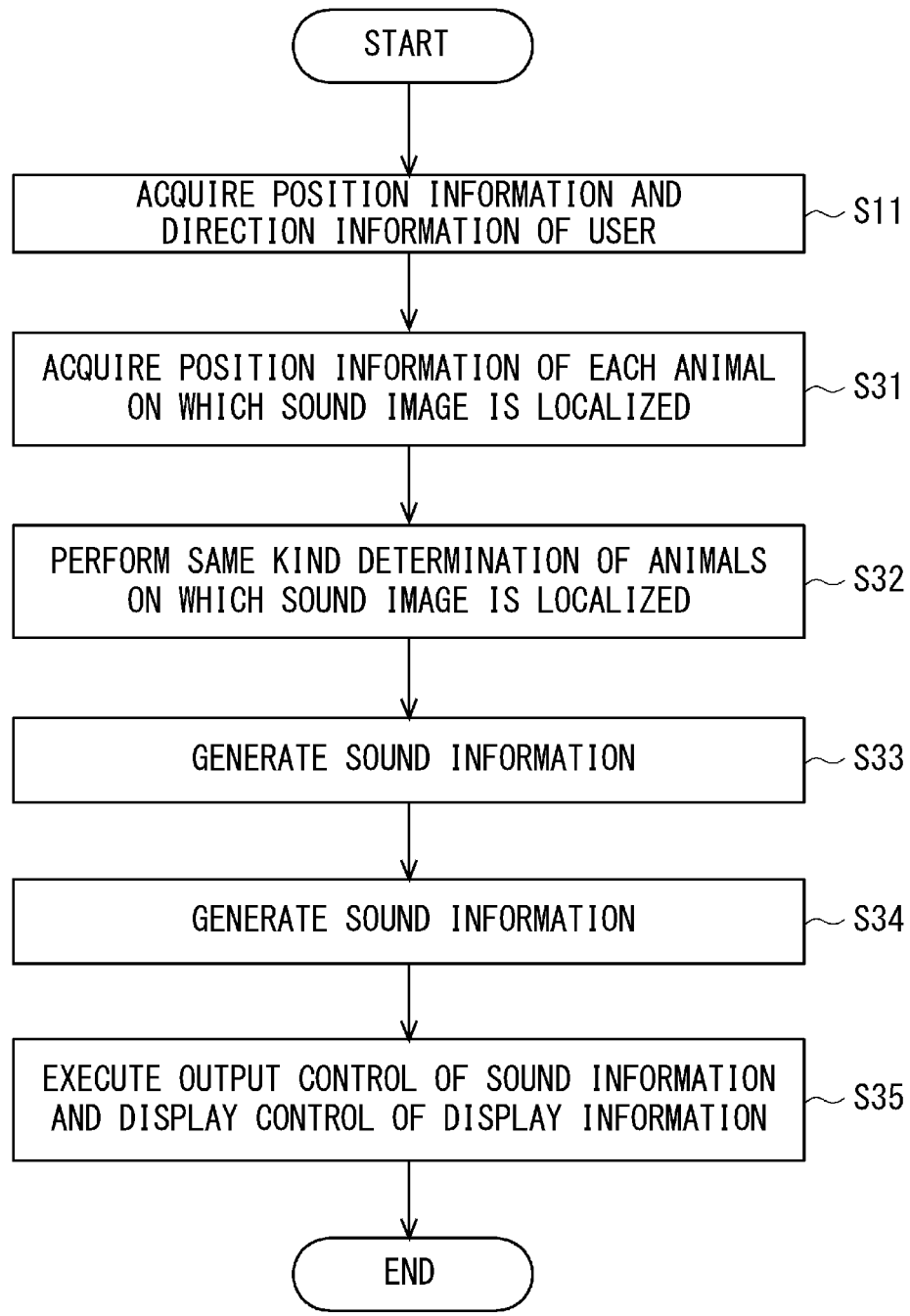
FIG. 11 is a flowchart showing an operation example of the server apparatus according to the fifth example embodiment.

Next, an operation example of the server apparatus 110 according to the fifth example embodiment will be described with reference to FIG. 11. FIG. 11 is a flowchart showing the operation example of the server apparatus according to the fifth example embodiment. The flowchart shown in FIG. 11 corresponds to that of FIG. 9, and is a flowchart in which steps S12, S13, S21, and S22 of the flowchart shown in FIG. 9 are replace with steps S31 and S33 to S35, respectively. In addition, the flowchart shown in FIG. 11 is a flowchart in which step S32 is added to the flowchart shown in FIG. 9.

An operation executed in step S11 out of operations of FIG. 11 is the same as that in FIG. 9, and thus will not be described.

In step S31, the target information acquisition unit 111 acquires position information of each of the plurality of animals on which the sound image is localized (step S31). In a case of being based on the captured image of the animal on which the sound image is localized, the position measurement signal, or the sensor data, the target information acquisition unit 111 can specify the number and position of animals on which the sound image is localized. Therefore, the target information acquisition unit 111 acquires the specified position as position information of each animal on which the sound image is localized.

In a case of using watching directions of a plurality of persons on which the sound image is localized, the target information acquisition unit 111 specifies, based on the captured image of each animal, the number of animals on which the sound image is localized. Then, the target information acquisition unit 111 selects as many animals as the number of animals, on which the sound image is localized, in order from the position of the intersection having the largest number of dotted lines indicating the watching direction and constituting each intersection from the positions (intersections) where the watching directions of the persons intersect.

Next, the target information acquisition unit 111 performs the same kind determination as to whether a plurality of animals on which sound image is localized are of the same kind (step S32). The target information acquisition unit 111 may determine, based on the position information of the plurality of animals on which the sound image is localized, whether the plurality of animals on which sound image is localized are of the same kind. The target information acquisition unit 62 may determine that the plurality of animals on which sound image is localized are of the same kind when the plurality of animals on which the sound image is localized is within a predetermined range, for example.

Alternatively, the target information acquisition unit 111 may acquire feature information of each animal on which the sound image is localized, and may determine, based on the acquired feature information of each animal, whether the plurality of animals on which sound image is localized are of the same kind. The target information acquisition unit 111 may calculate similarity of the feature information of the plurality of animals on which the sound image is localized, and may determine that the plurality of animals on which sound image is localized are of the same kind when the similarity is equal to or higher than a predetermined value.

Next, the generation unit 112 generates sound information related to an animal existing in the direction corresponding to the direction information of the user, among the plurality of animals on which the sound image is localized (step S33). The generation unit 112 specifies, based on the position information of the user, the direction information of the user, and the position information of the animal on which the sound image is localized, an animal existing in the face direction or the line-of-sight direction of the user, among the plurality of animals on which the sound image is localized. Then, the generation unit 112 generates sound information related to the specified animal, that is, sound information in which the sound image is localized on the specified animal. The generation unit 112 generates sound information according to the determination result of whether the plurality of animals on which sound image is localized are of the same kind.

Next, the generation unit 112 generates display information related to the animal existing in the direction (face direction or line-of-sight direction) corresponding to the direction information of the user, among the plurality of animals on which the sound image is localized (step S34). The generation unit 112 generates display information related to the animal specified in step S33. The generation unit 112 generates display information according to the determination result of whether the plurality of animals on which sound image is localized are of the same kind.

Next, the control unit 113 executes output control of the sound information and display control of the display information related to the animal existing in the direction (face direction or line-of-sight direction) corresponding to the direction information of the user, among the plurality of animals on which the sound image is localized (step S35). The control unit 113 specifies, based on the position information of the user, the direction information of the user, and the position information of the animal on which the sound image is localized, an animal existing in the face direction or the line-of-sight direction of the user, among the plurality of animals on which the sound image is localized. Then, the control unit 113 controls the output unit 42 to output the sound information related to the specified animal. Further, the control unit 113 controls the display unit 82 to display the display information related to the specified animal.

As described above, when the server apparatus 110 has the above-described configuration, the sound information and the display information corresponding to each animal can be output even when there are a plurality of animals on which the sound image is localized, and thus the sound information and the display information corresponding to each animal can be provided to the user.

Another Example Embodiment

Figure 12:
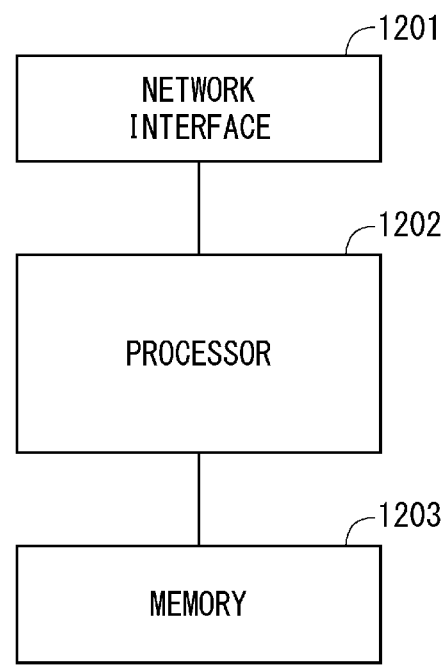
FIG. 12 is a block diagram illustrating a hardware configuration of the information processing apparatus according to each of the example embodiments of the present disclosure.

The information processing apparatus 1, the communication terminals 40, 50, and 80, and the server apparatuses 60, 70, 90, and 110 (hereinafter, referred to as information processing apparatus 1) described in the above-described example embodiments may have a hardware configuration as follows. FIG. 12 is a block diagram illustrating a hardware configuration of the information processing apparatus according to each of the example embodiments of the present disclosure.

Referring to FIG. 12, the information processing apparatus 1 includes a network interface 1201, a processor 1202, and a memory 1203. The network interface 1201 is used to communicate with other communication apparatuses having a communication function. The network interface 1201 may include, for example, a network interface card (NIC) conforming to a communication method including the IEEE (Institute of Electrical and Electronics Engineers) 802.11 series and IEEE 802.3 series.

The processor 1202 reads software (computer program) from the memory 1203 and executes the software to perform the process of the information processing apparatus 1 described using the flowchart in the above-described example embodiments. The processor 1202 may be, for example, a microprocessor, MPU (Micro Processing Unit), or CPU (Central Processing Unit). The processor 1202 may include a plurality of processors.

The memory 1203 is configured by a combination of a volatile memory and a nonvolatile memory. The memory 1203 may include a storage arranged away from the processor 1202. In this case, the processor 1202 may access the memory 1203 through an I/O interface (not shown).

In the example of FIG. 12, the memory 1203 is used to store software modules. The processor 1202 can read and execute these software modules from the memory 1203 to perform the process of the information processing apparatus 1 described in the above-described example embodiments.

As described with reference to FIG. 12, each of the processors included in the information processing apparatus 1 executes one or a plurality of programs including instructions for causing a computer to perform the algorithm described with reference to the drawings.

In the above-described example, the program may be stored and supplied to a computer using various types of non-transitory computer readable media. The non-transitory computer readable media include various types of tangible storage media. Examples of the non-transitory computer readable media include a magnetic recording medium (for example, a flexible disk, and a magnetic tape, and a hard disk drive), a magneto-optic recording medium (for example, a magneto-optic disk). Further, examples of the non-transitory computer readable media include a CD-ROM (Read Only Memory), a CD-R, and a CD-R/W. Further, examples of the non-transitory computer readable media include a semiconductor memory. Examples of the semiconductor memory include a mask ROM, a PROM (Programmable ROM), an EPROM (Erasable PROM), a flash ROM, and a RAM (Random Access Memory). These programs may be supplied to computers using various types of transitory computer readable media. Examples of the transitory computer readable media include an electrical signal, an optical signal, and an electromagnetic wave. The transitory computer readable media can supply programs to a computer through a wired communication line, for example, electric wires and optical fibers, or a wireless communication line.

Although the present invention is described above with reference to the example embodiments, the present invention is not limited to the above-described example embodiments. Various modifications that can be understood by those skilled in the art can be made to the configuration and details of the present invention within the scope of the present invention. Further, the present disclosure may be performed by an appropriate combination of the respective example embodiments.

Some or all of the above-described example embodiments may also be described as in the following supplementary notes, but are not limited to the following.

(Supplementary Note 1)

An information processing apparatus, comprising:

first acquisition unit configured to acquire first position information indicating position information of a user;

second acquisition unit configured to acquire second position information indicating position information of a predetermined object;

generation unit configured to generate, based on the first position information and the second position information, sound information in which a sound image is localized on the predetermined object, the sound information being related to the predetermined object; and control unit configured to execute control to output the generated sound information to the user.

(Supplementary Note 2)

The information processing apparatus according to Supplementary Note 1, wherein the first acquisition unit further acquires direction information of the user, and the generation unit generates the sound information based on the first position information, the second position information, and the direction information.

(Supplementary Note 3)

The information processing apparatus according to Supplementary Note 2, wherein the direction information includes a face direction of the user, and the control unit outputs the sound information according to whether the predetermined object exists in the face direction, based on the first position information, the face direction, and the second position information.

(Supplementary Note 4)

The information processing apparatus according to Supplementary Note 2 or 3, wherein the direction information includes a line-of-sight direction of the user, and the control unit outputs the sound information according to whether the predetermined object exists in the line-of-sight direction, based on the first position information, the second position information, and the line-of-sight direction.

(Supplementary Note 5)

The information processing apparatus according to any one of Supplementary Notes 1 to 4, wherein the generation unit generates display information related to the predetermined object, and the control unit executes control to display the display information on a screen of a communication terminal owned by the user.

(Supplementary Note 6)

The information processing apparatus according to Supplementary Note 5, wherein the control unit controls the display information to be displayable at an output timing of the sound information.

(Supplementary Note 7)

The information processing apparatus according to Supplementary Note 5 or 6, wherein the control unit notifies the user that the display information is displayed on the screen at the output timing of the sound information.

(Supplementary Note 8)

The information processing apparatus according to any one of Supplementary Notes 1 to 7, wherein the predetermined object includes a plurality of objects, the second acquisition unit acquires position information of each of the plurality of objects, and determines whether the plurality of objects are of the same kind, and the generation unit generates the sound information according to a result determined by the second acquisition unit.

(Supplementary Note 9)

A control method comprising:

acquiring first position information indicating position information of a user;

acquiring second position information indicating position information of a predetermined object;

generating, based on the first position information and the second position information, sound information in which a sound image is localized on the predetermined object, the sound information being related to the predetermined object; and executing control to output the generated sound information to the user.

(Supplementary Note 10)

A control program that causes a computer to execute:

a process of acquiring first position information indicating position information of a user;

a process of acquiring second position information indicating position information of a predetermined object;

a process of generating, based on the first position information and the second position information, sound information in which a sound image is localized on the predetermined object, the sound information being related to the predetermined object; and
a process of executing control to output the generated sound information to the user.

This application is based upon and claims the benefit of priority from Japanese Patent Application No. 2019-219107, filed on Dec. 3, 2019, the entire contents of which are incorporated herein by reference.

REFERENCE SIGNS LIST

1 INFORMATION PROCESSING APPARATUS
11 FIRST ACQUISITION UNIT
12 SECOND ACQUISITION UNIT
13, 63, 91, 112 GENERATION UNIT
14, 64, 92, 113 CONTROL UNIT
21 AREA
100 INFORMATION PROCESSING SYSTEM
40, 50, 80 COMMUNICATION TERMINAL
41 DIRECTION INFORMATION ACQUISITION UNIT
42 OUTPUT UNIT
51 USER POSITION INFORMATION ACQUISITION UNIT
60, 90, 110 SERVER APPARATUS
61 USER INFORMATION ACQUISITION UNIT
62, 72, 111 TARGET INFORMATION ACQUISITION UNIT
81 IMAGE CAPTURING UNIT
82 DISPLAY UNIT

What is claimed is:

1. An information processing apparatus comprising:
at least one memory storing instructions, and
at least one processor configured to execute the instructions to:
estimate a line-of-sight direction of each of a plurality of users, based on a captured image of the plurality of users;
acquire first position information indicating position information of each of the plurality of users and direction information of each of the plurality of users, the direction information including a face direction of each of the plurality of users and the line-of-sight direction of each of the plurality of users;
acquire second position information indicating position information of at least one predetermined object, by estimating a position where the line-of-sight direction of each of the plurality of users intersect with one another, the estimated position being the second position information;
generate, based on the first position information, the second position information, and the direction information, sound information in which a sound image is localized on the at least one predetermined object, the sound information being related to the at least one predetermined object; and
execute control to output the generated sound information to each of the plurality of users according to whether the at least one predetermined object exists in the face direction, based on the first position information, the face direction, and the second position information.

2. The information processing apparatus according to claim 1, wherein
the at least one processor is further configured to execute the instructions to output the sound information to each of the plurality of users according to whether the at least one predetermined object exists in the line-of-sight direction, based on the first position information, the second position information, and the line-of-sight direction.

3. The information processing apparatus according to claim 1, wherein
the at least one processor is further configured to execute the instructions to:
generate display information related to the at least one predetermined object; and
execute control to display the display information on a screen of a communication terminal of each of the plurality of users.

4. The information processing apparatus according to claim 3, wherein the at least one processor is further configured to execute the instructions to control the display information to be displayable at an output timing of the sound information.

5. The information processing apparatus according to claim 3, wherein the at least one processor is further configured to execute the instructions to notify each of the plurality of users that the display information is displayed on the screen at the output timing of the sound information.

6. The information processing apparatus according to claim 1, wherein
the at least one predetermined object comprises a plurality of predetermined objects, and
the at least one processor is further configured to execute the instructions to:
determine whether the plurality of predetermined objects are of a same kind; and
generate the sound information based on the first position information, the second position information, the direction information, and a determination result of whether the plurality of predetermined objects are of the same kind.

7. A control method performed by a computer and comprising:
estimating a line-of-sight direction of each of a plurality of users, based on a captured image of the plurality of users;
acquiring first position information indicating position information of each of the plurality of users and direction information of each of the plurality of users, the direction information including a face direction of each of the plurality of users and the line-of-sight direction of each of the plurality of users;
acquiring second position information indicating position information of a predetermined object, by estimating a position where the line-of-sight direction of each of the plurality of users intersect with one another, the estimated position being the second position information;
generating, based on the first position information, the second position information, and the direction information, sound information in which a sound image is localized on the predetermined object, the sound information being related to the predetermined object; and
executing control to output the generated sound information to each of the plurality of users according to whether the predetermined object exists in the face direction, based on the first position information, the face direction, and the second position information.

8. A non-transitory computer-readable medium storing a control program executable by a computer to perform processing including:
estimating a line-of-sight direction of each of a plurality of users, based on a captured image of the plurality of users;

acquiring first position information indicating position information of each of the plurality of users and direction information of each of the plurality of users, the direction information including a face direction of each of the plurality of users and the line-of-sight direction of each of the plurality of users;

acquiring second position information indicating position information of a predetermined object, by estimating a position where the line-of-sight direction of each of the plurality of users intersect with one another, the estimated position being the second position information;

generating, based on the first position information, the second position information, and the direction information, sound information in which a sound image is localized on the predetermined object, the sound information being related to the predetermined object; and executing control to output the generated sound information to each of the plurality of users according to whether the predetermined object exists in the face direction, based on the first position information, the face direction, and the second position information.

* * * * *